US011829284B2

(12) United States Patent
Ghergu et al.

(10) Patent No.: US 11,829,284 B2
(45) Date of Patent: Nov. 28, 2023

(54) AUTONOMOUS TESTING OF SOFTWARE ROBOTS

(71) Applicant: International Business Machines Corporation, Armonk, NY (US)

(72) Inventors: Laurentiu Gabriel Ghergu, Bucharest (RO); Adina Pana, Bucharest (RO); Iasmina Boldea, Giroc (RO); Pavol Dobiaš, Bratislava (SK); Erik Rueger, Ockenheim (DE)

(73) Assignee: International Business Machines Corporation, Armonk, NY (US)

( * ) Notice: Subject to any disclaimer, the term of this patent is extended or adjusted under 35 U.S.C. 154(b) by 94 days.

(21) Appl. No.: 17/340,206

(22) Filed: Jun. 7, 2021

(65) Prior Publication Data
US 2022/0391310 A1     Dec. 8, 2022

(51) Int. Cl.
*G06F 11/36*     (2006.01)
*G06F 9/455*     (2018.01)
*G06F 9/451*     (2018.01)
*G06F 11/07*     (2006.01)

(52) U.S. Cl.
CPC .......... *G06F 11/3688* (2013.01); *G06F 9/451* (2018.02); *G06F 11/3664* (2013.01); *G06F 11/0793* (2013.01); *G06F 11/362* (2013.01); *G06F 11/366* (2013.01); *G06F 11/3616* (2013.01); *G06F 11/3668* (2013.01); *G06F 11/3692* (2013.01)

(58) Field of Classification Search
CPC ............. G06F 11/3688; G06F 11/3664; G06F 11/3692; G06F 11/362; G06F 11/0793; G06F 11/3616; G06F 11/366; G06F 11/3668; G06F 9/451

See application file for complete search history.

(56) References Cited

U.S. PATENT DOCUMENTS

| 11,294,793 | B1* | 4/2022 | Stan ...................... G06F 11/362 |
| 11,334,471 | B1* | 5/2022 | Stocker ............... G06F 11/3684 |
| 2008/0133210 | A1 | 6/2008 | Chagoly et al. |
| 2017/0001308 | A1 | 1/2017 | Bataller et al. |
| 2020/0334136 | A1 | 10/2020 | Ramasamy et al. |

(Continued)

OTHER PUBLICATIONS

Sebastian Anderson et al., Automated Testing of Robotic Systems in Simulated Environments, Jun. 24, 2019, [Retrieved on Nov. 3, 2022]. Retrieved from the internet: <URL: https://www.diva-portal.org/smash/get/diva2:1329428/FULLTEXT01.pdf> 51 Pages (1-51) (Year: 2019).*

(Continued)

*Primary Examiner* — Anibal Rivera
(74) *Attorney, Agent, or Firm* — Stosch Sabo (57) ABSTRACT

Described are techniques for testing robotic process automation (RPA) bots. The techniques including a system comprising a computational environment configured to present a graphical user interface (GUI) on a display. The system further comprises an application configured to run on the computational environment. The system further comprises a robotic process automation (RPA) bot configured to execute tasks on the application using the GUI. The system further comprises an autonomous robot tester (ART) bot configured to execute a plurality of tests to disrupt the RPA bot by manipulating the GUI.

20 Claims, 7 Drawing Sheets

(56) References Cited

U.S. PATENT DOCUMENTS

| | | | | |
|---|---|---|---|---|
| 2021/0191367 A1* | 6/2021 | Iyer | | G06Q 10/0633 |
| 2021/0191843 A1* | 6/2021 | Stocker | | G06F 11/3684 |
| 2021/0347062 A1* | 11/2021 | Dinica | | G06F 8/36 |
| 2022/0050766 A1* | 2/2022 | Tate | | G06F 11/3608 |
| 2022/0100639 A1* | 3/2022 | Weishaar | | G06F 9/451 |

OTHER PUBLICATIONS

Hirohide Haga et al., Automatic Test Case Generation based on Genetic Algorithm and Mutation Analysis, 2012 IEEE, [Retrieved on Nov. 3, 2022]. Retrieved from the internet: <URL: https://ieeexplore.ieee.org/stamp/stamp.jsp?tp=&arnumber=6487127> 5 Pages (119-123) (Year: 2012).*

James Arnold et al., Testing Autonomous Robot Control Software using Procedural Content Genera, Sep. 24-24, 2023 [Retrieved on Aug. 18, 2023]. Retrieved from the internet: <URL: https://eprints.whiterose.ac.uk/103118/1/Arnold_Testing_Autonomous_Procedural_draft_v8_camera_ready.pdf> 13 Pages (1-13) (Year: 2013).*

IBM, "Robotic process automation (RPA)—Automate repetitive tasks", printed May 6, 2021, 6 pages.

IBM, "IBM Robotic Process Automation", printed May 6, 2021, 6 pages.

UiPATH, "How software robots can help", printed May 6, 2021, 9 pages.

Automation Anywhere, "Cloud RPA = Automation Anywhere", printed May 6, 2021, 1 page.

Blueprism, "Transform Your Business", printed May 6, 2021, 7 pages.

Chacon-Montero et al., "Towards a Method for Automated Testing in Robotic Process Automation Projects", 2019 IEEE/ACM 14th International Workshop on Automation of Software Test (AST), May 27-27, 2019, 6 pages.

Cernat et al., "Towards Automated Testing of RPA Implementations", A-TEST 2020: Proceedings of the 11th ACM SIGSOFT International Workshop on Automating TEST Case Design, Selection, and Evaluation, Nov. 2020, 4 pages.

Sharma, D., "Robotic Process Automation Testing Phase—Functional Testing of Low Code RPA Robots", Jun. 16, 2020, 6 pages.

Kukkuru et al., "Robotic Process Automation and Quality Assurance—A Perspective", 2018, 4 pages.

Unknown, "RPA Testing", RPA Functional & Performance Testing, ClicQA, printed Apr. 26, 2021, 4 pages.

Unknown, "RPA Testing—Debugging the Myths and Facts about RPA", Jan. 14, 2021, 8 pages.

Sharma, D., "Robotic Process Automation Testing Phase- Non-Functional Testing of RPA Robots", Jun. 23, 2020, 6 pages.

Aggarwal, M., "RPA Validation Pitfalls And How To Avoid Them", Delivery Manager, Infosys, 2018, 8 pages.

Mell et al., "The NIST Definition of Cloud Computing", Recommendations of the National Institute of Standards and Technology, Sep. 2011, 7 pages.

* cited by examiner

AUTONOMOUS TESTING OF SOFTWARE ROBOTS

BACKGROUND

The present disclosure relates to robotic process automation (RPA), and, more specifically, to testing RPA robots (bots).

RPA is a form of business process automation technology based on software robots (bots) or artificial intelligence (AI)/digital workers. It is sometimes referred to as software robotics. While some workflow automation tools require a software developer to produce an application programming interface (API) to automate a task, RPA can automate the task by observing a user perform that task in an application's graphical user interface (GUI). The RPA bot can then perform the automation by automatically repeating the observed tasks directly in the application's GUI. Thus, RPA can lower the technical barrier to automating tasks in products that might not expose any APIs.

SUMMARY

Aspects of the present disclosure are directed toward a computer-implemented method comprising deploying a robotic process automation (RPA) bot and an autonomous robot tester (ART) bot into a computational environment, where the RPA bot automates tasks on an application implemented in the computational environment by manipulating a graphical user interface (GUI) associated with the computational environment and the application. The method further comprises performing, by the ART bot, a plurality of tests configured to disrupt the RPA bot by manipulating the GUI. The method further comprises detecting whether the RPA bot passes the plurality of tests.

Additional aspects of the present disclosure are directed to systems and computer program products configured to perform the method described above.

Further aspects of the present disclosure are directed toward a system comprising a computational environment configured to present a graphical user interface (GUI) on a display. The system further comprises an application configured to run on the computational environment. The system further comprises a robotic process automation (RPA) bot configured to execute tasks on the application using the GUI. The system further comprises an autonomous robot tester (ART) bot configured to execute a plurality of tests to disrupt the RPA bot by manipulating the GUI.

The present summary is not intended to illustrate each aspect of, every implementation of, and/or every embodiment of the present disclosure.

BRIEF DESCRIPTION OF THE DRAWINGS

The drawings included in the present application are incorporated into and form part of the specification. They illustrate embodiments of the present disclosure and, along with the description, serve to explain the principles of the disclosure. The drawings are only illustrative of certain embodiments and do not limit the disclosure.

While the present disclosure is amenable to various modifications and alternative forms, specifics thereof have been shown by way of example, in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward robotic process automation (RPA), and, more specifically, to testing RPA robots (bots). While not limited to such applications, embodiments of the present disclosure may be better understood in light of the aforementioned context.

RPA tools have technical similarities to graphical user interface testing tools which can also automate interactions with the GUI (e.g., by repeating a set of demonstration actions performed by a user). RPA tools differ from graphical user interface testing tools insofar as they allow data to be handled in applications and between multiple applications (e.g., receiving email containing an invoice, extracting the data, and then typing that data into a bookkeeping system). RPA is more extensible than previous forms of GUI-based automation (e.g., screen scraping) insofar as RPA can enable API integration with other enterprise applications, integration into Information Technology Service Management (ITSM) systems, integration with terminal services, and even integration into some types of Artificial Intelligence (AI) and/or machine learning services (e.g., image recognition).

RPA provides a pragmatic means of deploying new services insofar as RPA bots are configured to mimic the behavior of humans to perform a given task. Benefits of RPA generally include reduced cost, increased performance (e.g., increased speed, accuracy, and consistency), improved quality, and/or improved scalability. RPA can also provide improved security (e.g., for financial services, healthcare, and/or other applications interacting with sensitive data that require rigorous adherence to data-handling protocols).

However, RPA bots can experience challenges to deployment. For example, while executing a process, RPA bots can encounter unexpected situations triggered by the environment in which the RPA bot is working. As one example, after an RPA bot logs into a Windows® computational environment (e.g., a virtual machine), the start menu may remain open which may hamper the RPA bot's ability to click the necessary icons on the desktop. To counter such an error, a programmer can implement countermeasures like ensuring that the RPA bot clicks on the desktop immediately after each login in so that the start menu can be closed if it is unexpectedly opened. As another example, a Windows® firewall popup may appear on top of key elements. In this situation, an RPA bot can be programmed to click at a specific absolute location where the covered key element is located. In doing so, the RPA bot is unable to successfully complete its automated task insofar as the specific absolute location is covered by the popup.

Currently, there are relatively few solutions for testing RPA bots. Most commonly, a programmer developing an RPA bot manually tests the developed RPA bot. However, this solution requires tedious human interaction to configure and/or run tests. Further, human testing is prone to error. As another example, some RPA platforms allow programmers to write code to test specific components of an RPA bot. As discussed above, this solution requires tedious human interaction to configure and/or run tests. Furthermore, this solution only tests components of an RPA bot, thus, there is no integration testing (e.g., no real-world testing). Collectively, there is a need for automated, rigorous, integrated testing of RPA bots.

Aspects of the present disclosure are directed toward automated, rigorous, integrated testing of RPA bots. Aspects of the present disclosure utilize an Autonomous Robot Tester (ART) bot. The ART bot can be a software robot (e.g., a specially configured RPA bot) installed on the computational environment with one or more RPA bots. The ART bot can be configured to randomly execute a plurality of tests configured to create problems and/or confuse the RPA bots in order to verify the reliability of their programming. Accordingly, the ART bot can increase trust in the programming of the RPA bots by checking how the RPA bots respond to unexpected operating system situations (e.g., a firewall popup appearing, a start menu opened at unexpected time, etc.) which are not business logic related.

In various embodiments, the ART bot can run against production RPA bots or test RPA bots. One benefit of running the ART bot directly in production is that doing so further tests the disaster recovery capabilities and resilience of the production RPA bots (in the event of an RPA bot crashing as a result of the testing). One benefit of running the ART bot in a test environment is that doing so limits the potential disruption of a production RPA bot crashing in a production environment.

Figure 1:
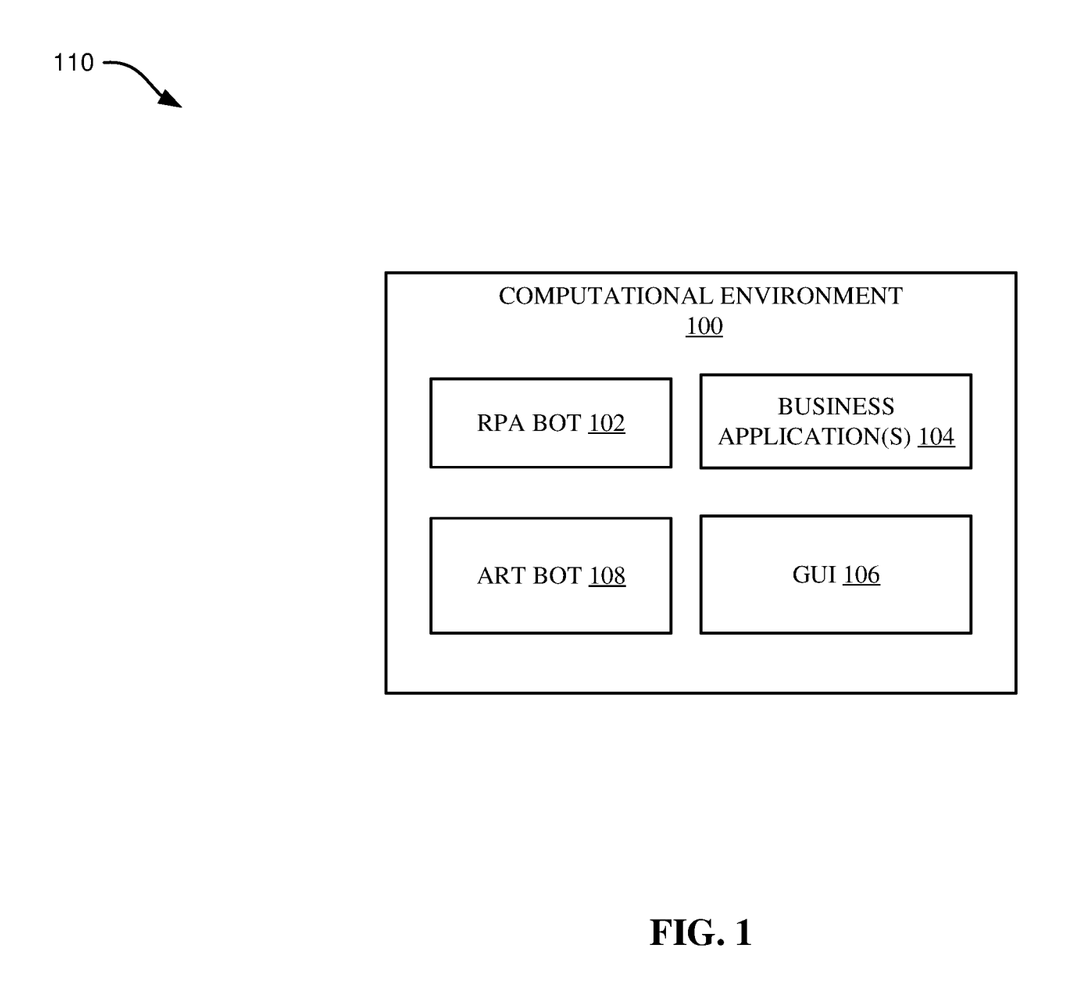
FIG. 1 illustrates a block diagram of an example computational environment implementing an RPA bot and an ART bot, in accordance with some embodiments of the present disclosure.

Referring now to the figures, FIG. 1 illustrates a block diagram of an example computational environment 100 implementing an RPA bot 102 and an ART bot 108, in accordance with some embodiments of the present disclosure. Computational environment 100 can be, for example, a virtual machine comprising a set of virtualized computational resources provisioned to a device such as, but not limited to, a desktop, a laptop, a tablet, a smartphone, a server, a mainframe, or another configuration of hardware and/or software. The virtualized computational resources can include processing resources, storage resources, networking resources, and/or other virtualized computational resources that can be provisioned to simulate a full or partial computer from disparate computational resources. In other embodiments, the computational environment 100 can comprise a desktop, laptop, mainframe, smartphone, or other discrete computational device using embedded computational resources rather than provisioned, virtualized computational resources. In yet other embodiments, the computational environment 100 can include bare metal servers, containers, and the like.

The computational environment 100 can include an RPA bot 102 that is configured to automate tasks on one or more business application(s) 104. Business application 104 can be any application implementable on a computational device. Business application 104 can be comprised of software, middleware, firmware, or other forms, packages, and/or containers of programmatic code that enables the business application 104 to perform various tasks and processes in the computational environment 100.

RPA bot 102 can automate tasks performed on business application 104 by mimicking human interaction with a graphical user interface (GUI) 106. The GUI 106 can display an interface that enables interaction between a user (or RPA bot 102) and the business application 104 and/or the computational environment 100. The RPA bot 102 can manipulate the GUI 106 by, for example, moving a cursor, clicking a cursor, opening and/or closing windows, opening and/or closing dialog boxes, typing commands, retrieving data, extracting data, populating data, implementing shortcuts (e.g., hot keys), and/or other types of manipulations on GUI 106.

ART bot 108 can be configured to test the RPA bot 102. In some embodiments, the ART bot 108 can be an RPA bot that is configured for testing RPA bots 102. As is understood by one skilled in the art, current deficiencies in RPA testing include (i) the manual nature of current testing, and (ii) the component-based nature of current testing. Thus, current RPA testing is inefficient (e.g., time intensive, prone to human error), and incomplete (e.g., there is a lack of integrated testing). The ART bot 108 overcomes these deficiencies by automatically testing RPA bot 102. The ART bot 108 can implement a variety of tests representing real-world implementations that could potentially disrupt the RPA bot 102. The ART bot 108 can be configured to notify a user and/or orchestrator if the RPA bot 102 crashes as a result of a test executed by the ART bot 108. Although the term "crash" is generally used in the present disclosure, it should be understood that the term "crash" encompasses any failure of RPA bot 102 such as, for example, unsuccessful completion of an automated task, completion of a task with a duration above a threshold, completion of a task with unintended consequences, or any other failure, flaw, or defect detected in RPA bot 102 as a result of the tests executed by ART bot 108. Similarly, the ART bot 108 can be configured to notify a user and/or orchestrator if the RPA bot 102 successfully navigates each of the tests executed by the ART bot 108.

In various embodiments, the computational environment 100 is deployed in a test environment or a production environment. When deployed in a test environment, the ART bot 108 can test the RPA bot 102 in a manner that limits the consequences of crashing the RPA bot 102. In contrast, when deployed in a production environment, the ART bot 108 can test the RPA bot 102 in a manner that mimics real-world usage, including the backup and/or restore capabilities of the business application 104 and/or the computational environment 100 in the event the RPA bot 102 crashes as a result of testing by the ART bot 108.

Collectively, the components of FIG. 1 can be referred to as a system 110, where the system 110 can include numerous computational environments 100, each having one or more RPA bots 102 automating tasks on one or more business applications 104 via one or more GUIs 106. Likewise, one or more ART bots 108 can be deployed on one, some, or each of a plurality of computational environments 100 to respectively test, cumulatively test, or partially test, one some, or all of RPA bots 102.

Figure 2:
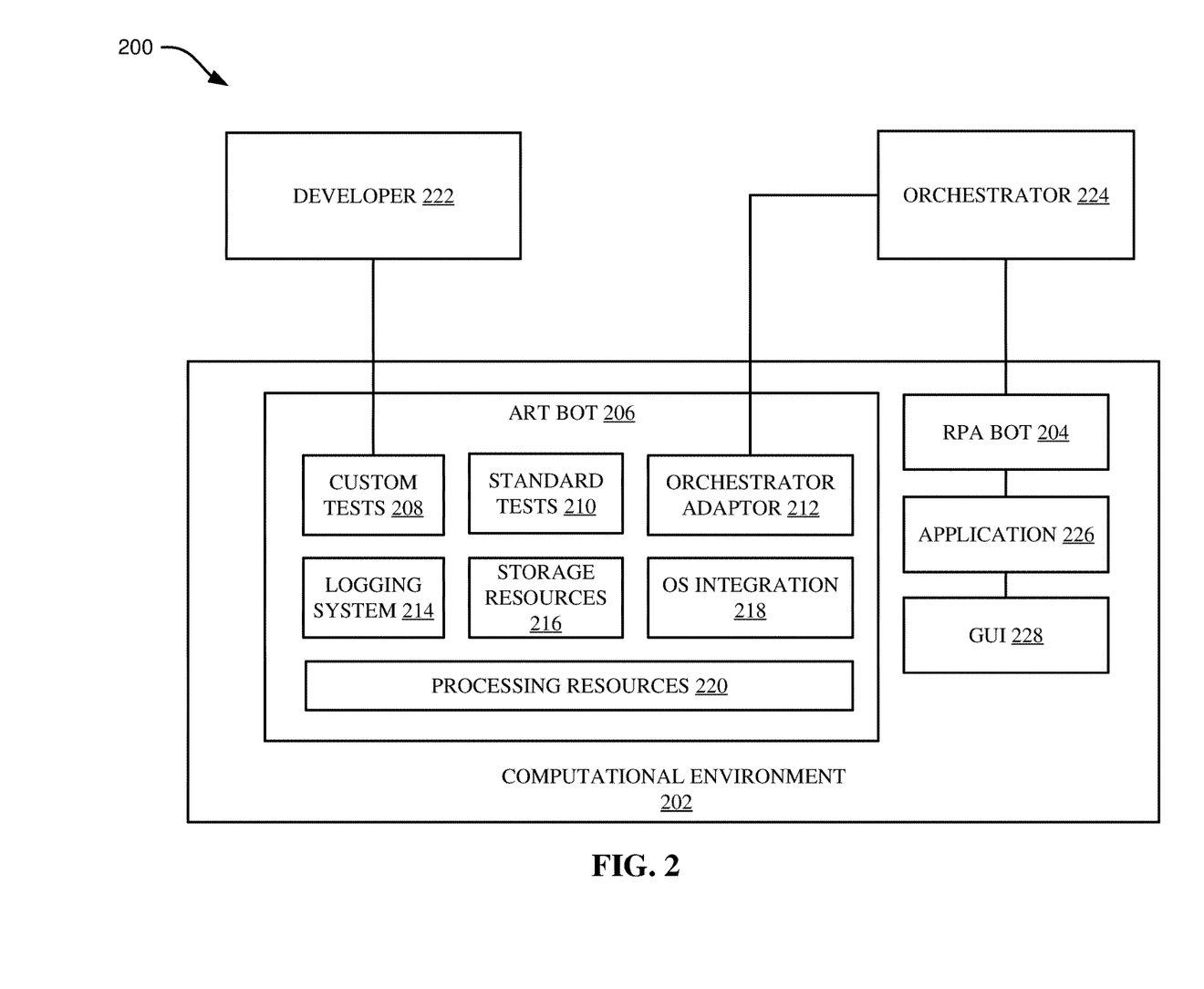
FIG. 2 illustrates a block diagram of an example system including a computational environment implementing an RPA bot and an ART bot, in accordance with some embodiments of the present disclosure.

FIG. 2 illustrates a block diagram of an example system 200 including a computational environment 202 implementing an RPA bot 204 and an ART bot 206, in accordance with some embodiments of the present disclosure. In some embodiments, the computational environment 202 is consistent with the computational environment 100 of FIG. 1, the RPA bot 204 is consistent with the RPA bot 102 of FIG. 1, the application 226 is consistent with the business application 104 of FIG. 1, the ART bot 206 is consistent with the ART bot 108 of FIG. 1, and/or the GUI 228 is consistent with the GUI 106 of FIG. 1.

The computational environment 202 can implement an ART bot 206, an RPA bot 204, an application 226, and a GUI 228. The ART bot 206 can include custom tests 208 and standard tests 210. Custom tests 208 can be manually defined by a developer 222 and configured to disrupt the RPA bot 204 by manipulating aspects of application 226. For example, custom tests 208 can modify, generate, minimize, maximize, resize, select, or otherwise manipulate windows, popups, dialog boxes, screens, buttons, icons, and/or other aspects of application 226. Thus, custom tests 208 can manipulate and/or modify aspects of application 226 and/or portions of the GUI 228 displaying aspects of the application 226.

In some embodiments, custom tests 208 can be associated with Domain Specific Language (DSL) triggers, where the DSL triggers can initiate certain tests. For example, the DSL triggers can be implemented on a schedule utilizing a software utility (e.g., software utility cron), based on the RPA bot 204, and/or in response to a predetermined configuration presented on the GUI 228. For example, a custom test 208 can include the trigger "<html app='firefox.exe' title='ACME System 1-Log In'/><webctrl id='email' tag='INPUT'/>". In this example, when a defined element in a trigger is presented on the GUI 228, the associated custom test 208 can be initiated. Likewise, when another defined element in the trigger is presented on the GUI 228, the associated custom test 208 can be ended. In the aforementioned example, the custom test 208 can initiate when a login screen is presented and conclude when an email address is entered into the login screen. During the intermediary between the start and stop conditions, the custom test 208 can manipulate the GUI 228 to disrupt the RPA bot 204 such as, for example, by altering a size of a window associated with the login screen, opening a menu, generating a dialog box associated with the application 226, and the like.

Standard tests 210 can manipulate and/or modify aspects of computational environment 202 such as, for example, manipulating a portion of the GUI 228 related to an operating system (OS) display (e.g., opening/closing a menu, opening/closing a dialog box, opening/closing a command line, maximizing/minimizing/resizing a window, moving a cursor, clicking a cursor, etc.). In some embodiments, standard tests 210 are preconfigured for the computational environment 202 and do not need to be manually created by the developer 222.

ART bot 206 can further include an orchestrator adaptor 212 for communicating with an orchestrator 224 associated with the computational environment 202. The orchestrator 224 can provide monitoring and/or management of numerous RPA bots 204 within an enterprise environment (e.g., within a plurality of computational environments 202 managed by, or provisioned to, a same enterprise). Advantageously, orchestrator adaptor 212 can make ART bot 206 vendor-agnostic insofar as the orchestrator adaptor 212 is capable of interfacing with a variety of types, brands, and/or configurations of orchestrator 224.

ART bot 206 further includes a logging system 214 for determining if, when, and/or how the RPA bot 204 fails during testing by the ART bot 206. In some embodiments, if the logging system 214 detects that the RPA bot 204 has failed, the ART bot 206 stops implementing tests until the RPA bot 204 is restored.

ART bot 206 further includes storage resources 216 and processing resources 220. Storage resources 216 and processing resources 220 can collectively provide computational resources sufficient for enabling ART bot 206 to implement tests to determine the resilience and reliability of RPA bot 204. As one example, custom tests 208 and standard tests 210 can be stored in storage resources 216 and implemented using the processing resources 220.

ART bot 206 further includes OS integration 218 which can include programming logic configured to enable ART bot 206 to interact with a variety of operating systems. Thus, OS integration 218 enables ART bot 206 to perform standard tests 210 on various OSs, where the standard tests include OS-specific tasks such as, for example, opening a popup, clicking a start menu, moving a cursor, and the like, where these OS-specific tasks can be implemented differently on different OSs.

Figure 3:
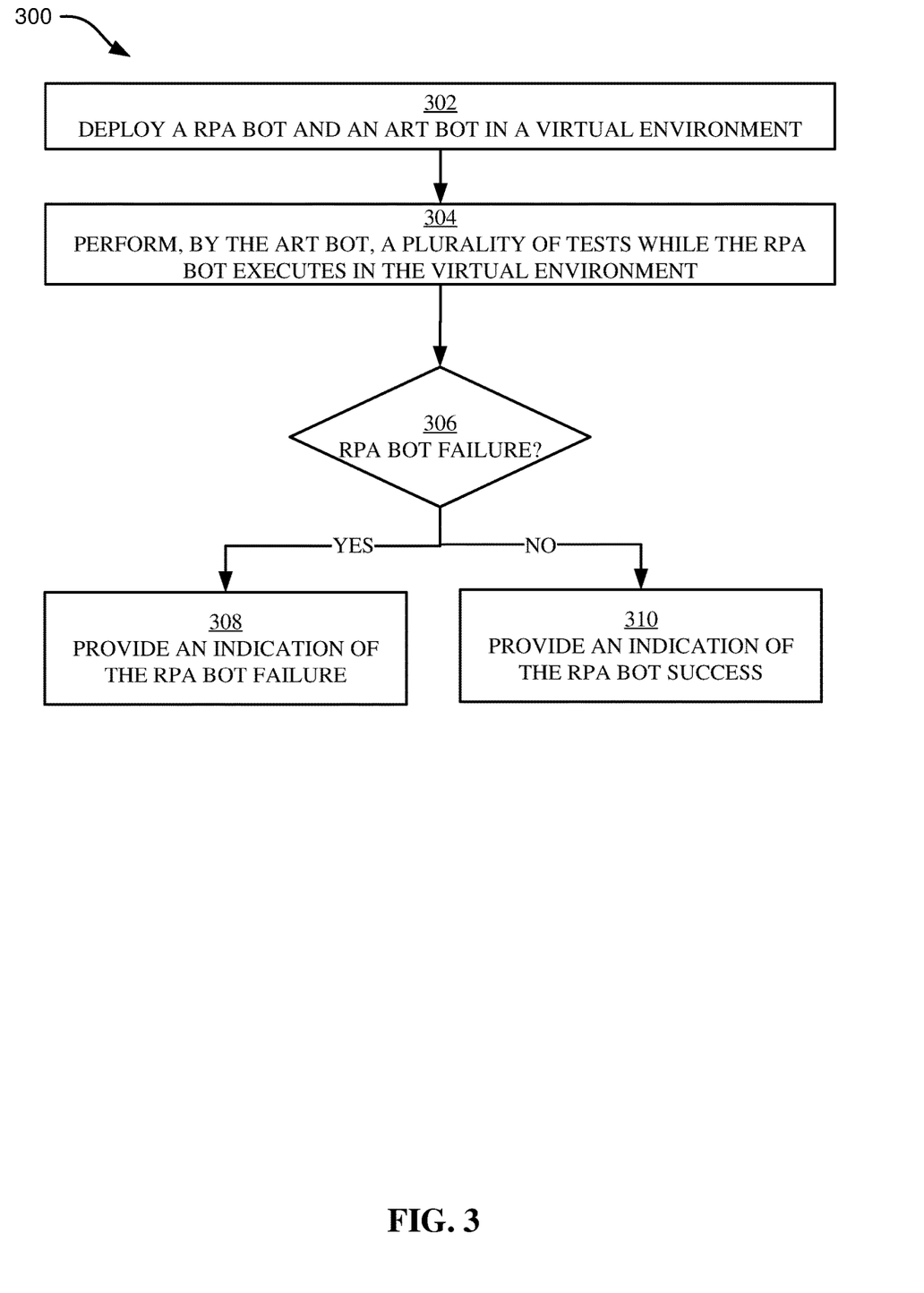
FIG. 3 illustrates a flowchart of an example method for testing an RPA bot using an ART bot, in accordance with some embodiments of the present disclosure.

FIG. 3 illustrates a flowchart of an example method 300 for testing an RPA bot using an ART bot, in accordance with some embodiments of the present disclosure. In some embodiments, the method 300 is implemented by a computational environment, an ART bot, a computer, a processor, and/or another configuration of hardware and/or software.

Operation 302 includes deploying an RPA bot and an ART bot in a computational environment. The computational environment can include one or more virtual machines and/or physical computational devices. The RPA bot can be configured to automate tasks associated with an application implemented in the computational environment. The ART bot can be configured to run tests configured to disrupt the RPA bot while the RPA bot executes the automated tasks. Accordingly, the ART bot can test the resilience and/or reliability of the RPA bot. The computational environment can be a test environment or a production environment.

Operation 304 includes performing, by the ART bot, a plurality of tests while the RPA bot executes the automated tasks on the application in the computational environment. In some embodiments, the plurality of tests include custom tests and/or standard tests. In some embodiments, at least one of the plurality of tests is configured to manipulate and/or modify an application or a portion of a GUI presenting an aspect of the application. In some embodiments, at least one of the plurality of tests is configured to manipulate and/or modify the computational environment (e.g., an OS of the computational environment) or a portion of a GUI presenting an aspect of the OS. In some embodiments, the tests are performed in a random order. In some embodiments, the tests are performed at random time instances during a predetermined testing time period.

Operation 306 includes determining if the RPA bot has failed, crashed, or otherwise been rendered ineffective as a result of one or more of the plurality of tests performed by the ART bot. If not (306: NO), then the method 300 proceeds to operation 310 and provides an indication of the RPA bot success. If so (306: YES), then the method 300 proceeds to operation 308 and provides an indication of the RPA bot failure. In some embodiments, the indication of operations 308 or 310 is transmitted to an orchestrator associated with the computational environment via an orchestrator adaptor of the ART bot. Although not explicitly shown, operation 308 can further include pausing, stopping, or otherwise delaying execution of additional tests by the ART bot until the RPA bot is restored.

Figure 4:
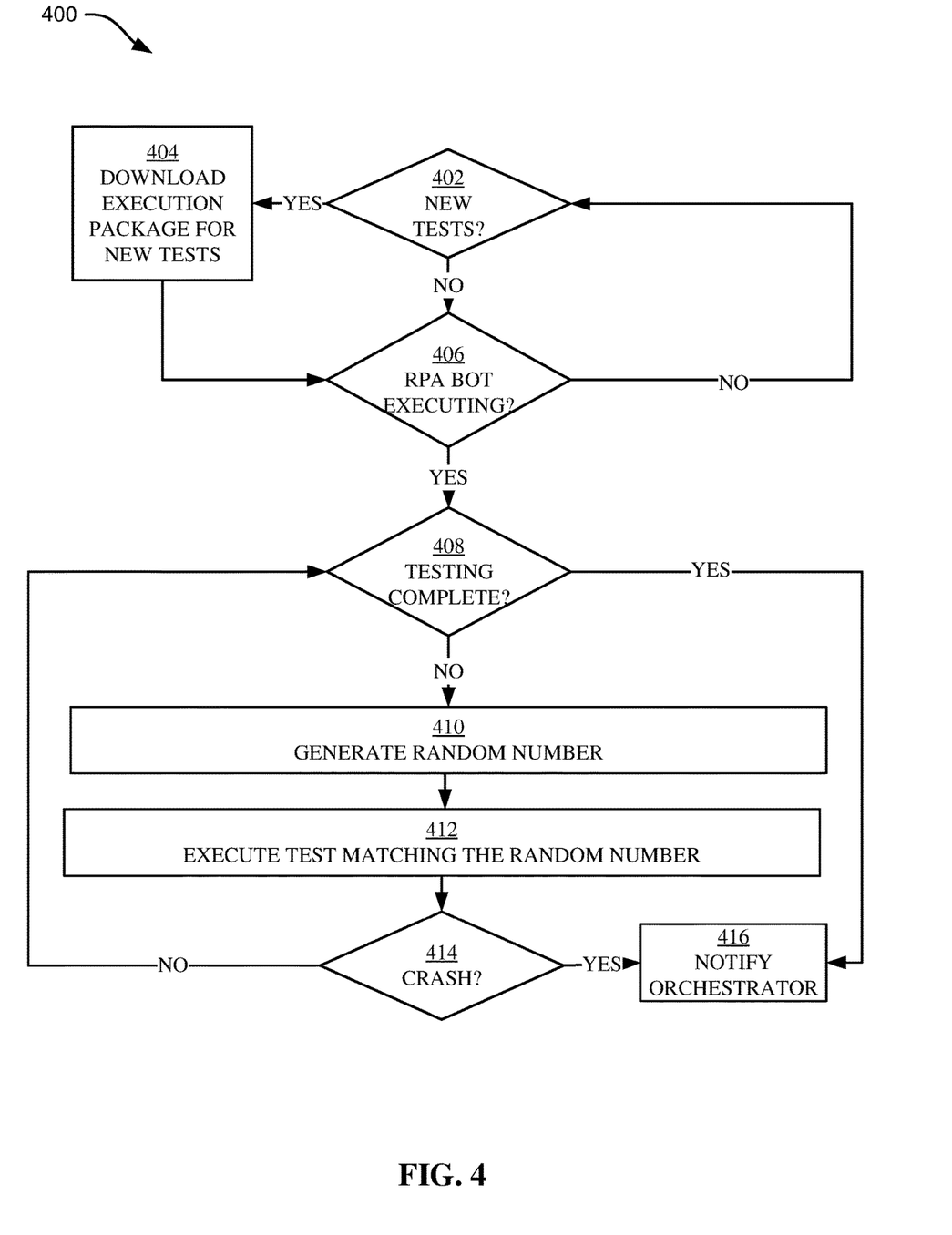
FIG. 4 illustrates a flowchart of another example method for testing an RPA bot using an ART bot, in accordance with some embodiments of the present disclosure.

FIG. 4 illustrates a flowchart of another example method 400 for testing an RPA bot using an ART bot, in accordance with some embodiments of the present disclosure. In some embodiments, the method 400 is implemented by a computational environment, an ART bot, a computer, a processor, and/or another configuration of hardware and/or software.

Operation 402 includes checking for new tests to download. New tests can be identified and downloaded based on a variety of factors associated with a computational environment implementing an RPA bot such as, but not limited to, a type of RPA bot, a vendor of the RPA bot, an application on which the RPA bot is automating tasks, a type of task the RPA bot automates, a type of computational environment the RPA bot is implemented in, an OS of the computational environment the RPA bot is implemented in, and/or other factors. Operation 402 can involve querying a server, database, or other communicatively coupled storage resource for the new tests. If operation 402 detects any new tests (402: YES), operation 402 can proceed to operation 404 and download an execution package for the detected new tests and store the downloaded execution package for the detected new tests in storage resources associated with the ART bot.

After operation 404 (or if operation 402 determines there are no new tests), the method 400 proceeds to operation 406 and determines if the RPA bot is executing. If not (406: NO), the method 400 returns to operation 402 at repeated intervals until the RPA bot is executing. If so (406: YES), then the method proceeds to operation 408. Operation 408 includes determining if testing is complete. If not (408: NO), the method 400 proceeds to operation 410 and generates a random number. The random number can be a pseudo-random number generated by any random number generating functionality now known or later developed. The generated random number can be a number between 1 and n, where n corresponds to a number of tests of the plurality of tests that have not yet been implemented by the ART bot. Each of the remaining tests can be associated with a number. Operation 412 includes executing, by the ART bot, a test matching the random number.

Operation 414 includes determining if the RPA bot crashed as a result of executing the test matching the random number. If not (414: NO), then the method 400 returns to operation 408 and proceeds again through operations 410-414 until the testing is complete. If the RPA bot did crash as a result of executing the test matching the random number (414: YES), then the method 400 proceeds to operation 416 and notifies an orchestrator associated with the computational environment implementing the RPA bot and the ART bot that the RPA bot crashed as a result of the testing by the ART bot. In some embodiments, the orchestrator is notified by an orchestrator adaptor of the ART bot.

Although not explicitly shown, operation 416 can include restoring the RPA bot (e.g., correcting the RPA bot so that it does not crash as a result of the test matching the random number that previously caused it to crash). After restoring the RPA bot, the method 400 can return to operation 408 and cycle through operations 410-414 until testing is completed. Referring again to operation 408, once the testing is completed (408: YES), the method 400 can proceed to operation 416 and notify the orchestrator that testing is completed.

Figure 5:
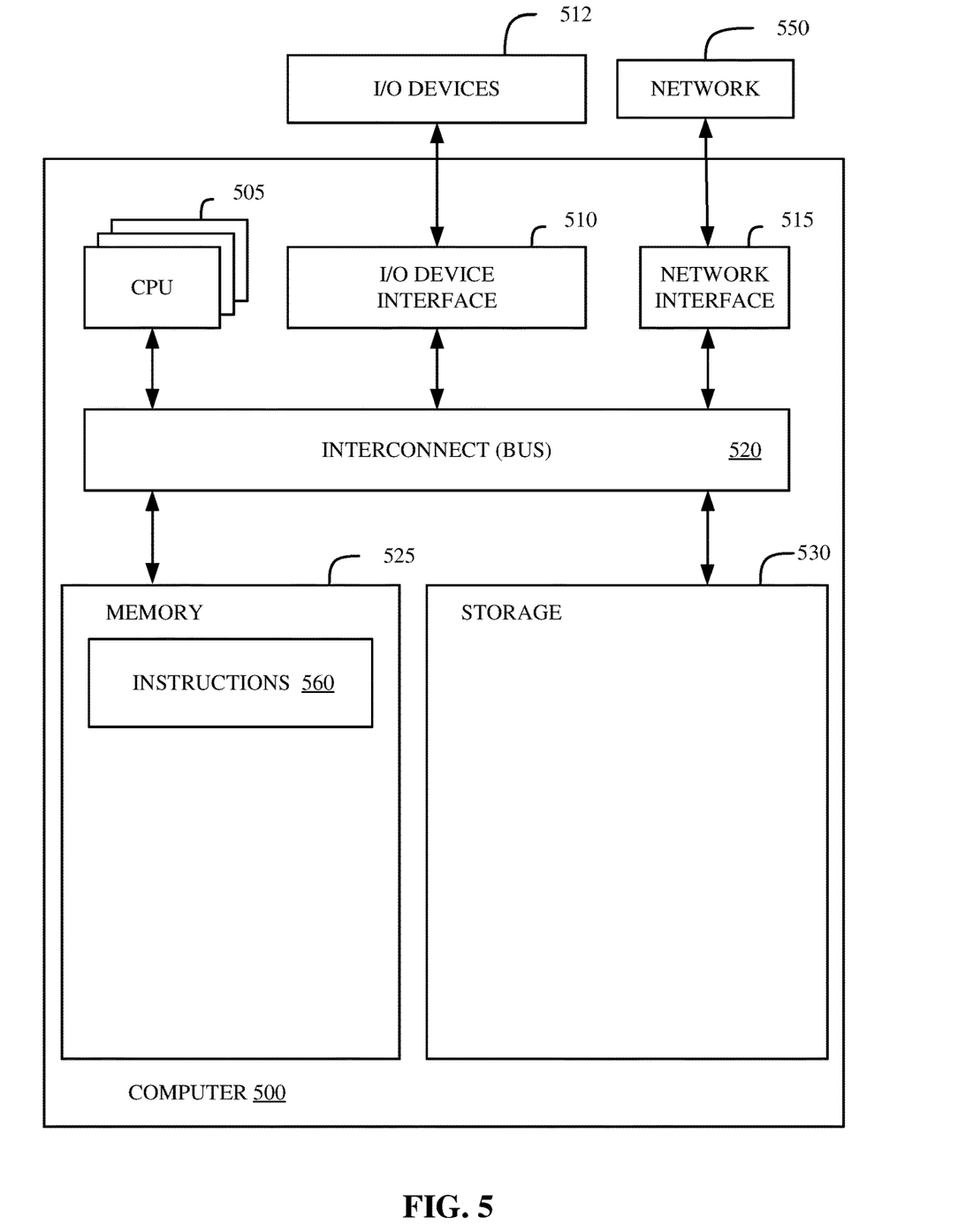
FIG. 5 illustrates a block diagram of an example computer, in accordance with some embodiments of the present disclosure.

FIG. 5 illustrates a block diagram of an example computer 500 in accordance with some embodiments of the present disclosure. In various embodiments, computer 500 can perform any or all portions of the method described in FIGS. 3-4 and/or implement the functionality discussed in FIGS. 1-2. In some embodiments, computer 500 receives instructions related to the aforementioned methods and functionalities by downloading processor-executable instructions from a remote data processing system via network 550. In other embodiments, computer 500 provides instructions for the aforementioned methods and/or functionalities to a client machine such that the client machine executes the method, or a portion of the method, based on the instructions provided by computer 500. In some embodiments, the computer 500 is incorporated into (or functionality similar to computer 500 is virtually provisioned to) one or more entities illustrated of FIG. 1, FIG. 2, and/or other aspects of the present disclosure.

Computer 500 includes memory 525, storage 530, interconnect 520 (e.g., a bus), one or more CPUs 505 (also referred to as processors herein), I/O device interface 510, I/O devices 512, and network interface 515.

Each CPU 505 retrieves and executes programming instructions stored in memory 525 or storage 530. Interconnect 520 is used to move data, such as programming instructions, between the CPUs 505, I/O device interface 510, storage 530, network interface 515, and memory 525. Interconnect 520 can be implemented using one or more buses. CPUs 505 can be a single CPU, multiple CPUs, or a single CPU having multiple processing cores in various embodiments. In some embodiments, CPU 505 can be a digital signal processor (DSP). In some embodiments, CPU 505 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 525 is generally included to be representative of a random-access memory (e.g., static random-access memory (SRAM), dynamic random-access memory (DRAM), or Flash). Storage 530 is generally included to be representative of a non-volatile memory, such as a hard disk drive, solid state device (SSD), removable memory cards, optical storage, or flash memory devices. In an alternative embodiment, storage 530 can be replaced by storage area-network (SAN) devices, the cloud, or other devices connected to computer 500 via I/O device interface 510 or network 550 via network interface 515.

In some embodiments, memory 525 stores instructions 560. However, in various embodiments, instructions 560 are stored partially in memory 525 and partially in storage 530, or they are stored entirely in memory 525 or entirely in storage 530, or they are accessed over network 550 via network interface 515.

Instructions 560 can be computer-readable and computer-executable instructions for performing any portion of, or all of, the method of FIGS. 3-4 and/or implement the functionality discussed in FIGS. 1-2. Although instructions 560 are shown in memory 525, instructions 560 can include program instructions collectively stored across numerous computer-readable storage media and executable by one or more CPUs 505.

In various embodiments, I/O devices 512 include an interface capable of presenting information and receiving input. For example, I/O devices 512 can present information to a user interacting with computer 500 and receive input from the user.

Computer 500 is connected to network 550 via network interface 515. Network 550 can comprise a physical, wireless, cellular, or different network.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, computational environments, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
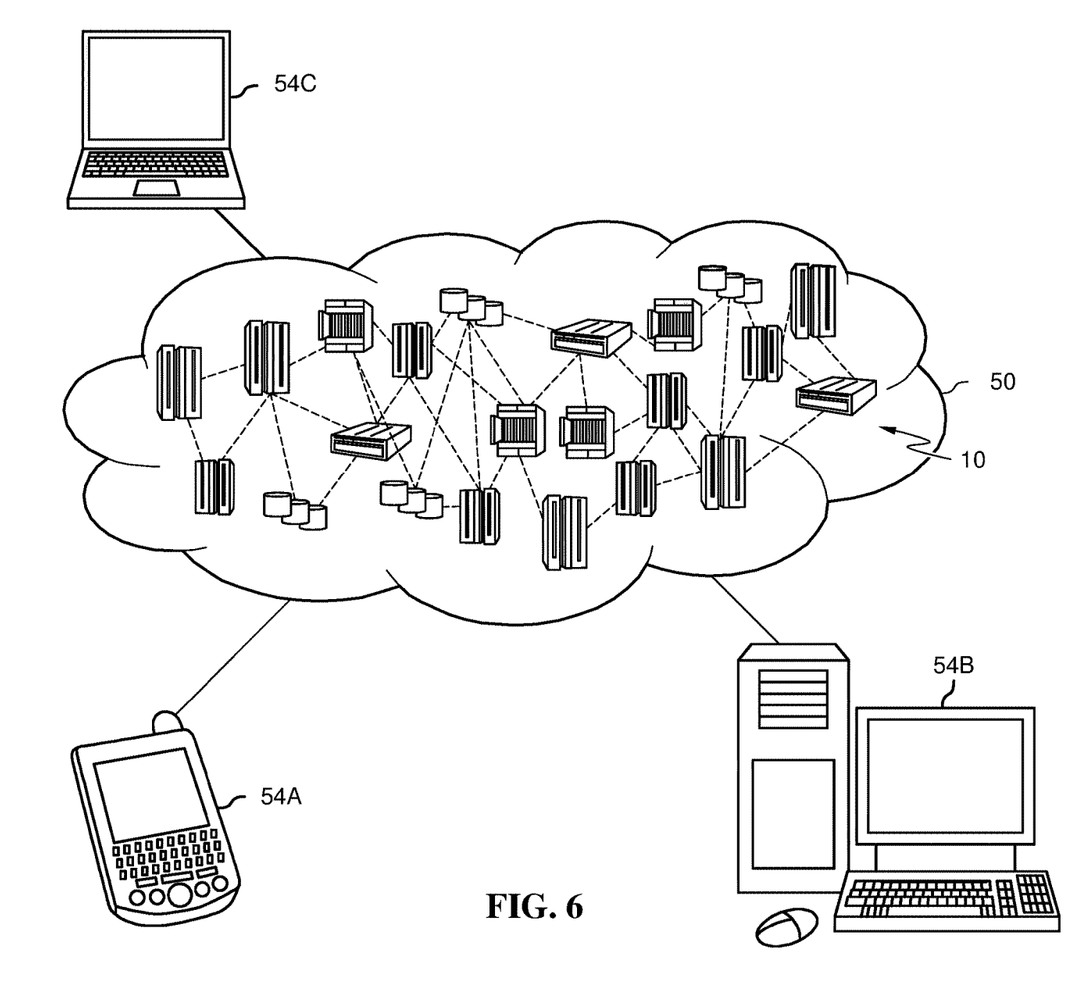
FIG. 6 depicts a cloud computing environment, in accordance with some embodiments of the present disclosure.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, and/or laptop computer 54C may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-C shown in FIG. 6 are intended to be illustrative only and that computing nodes 10 and cloud computing environment 50 can communicate with any type of computerized device over any type of network and/or network addressable connection (e.g., using a web browser).

Figure 7:
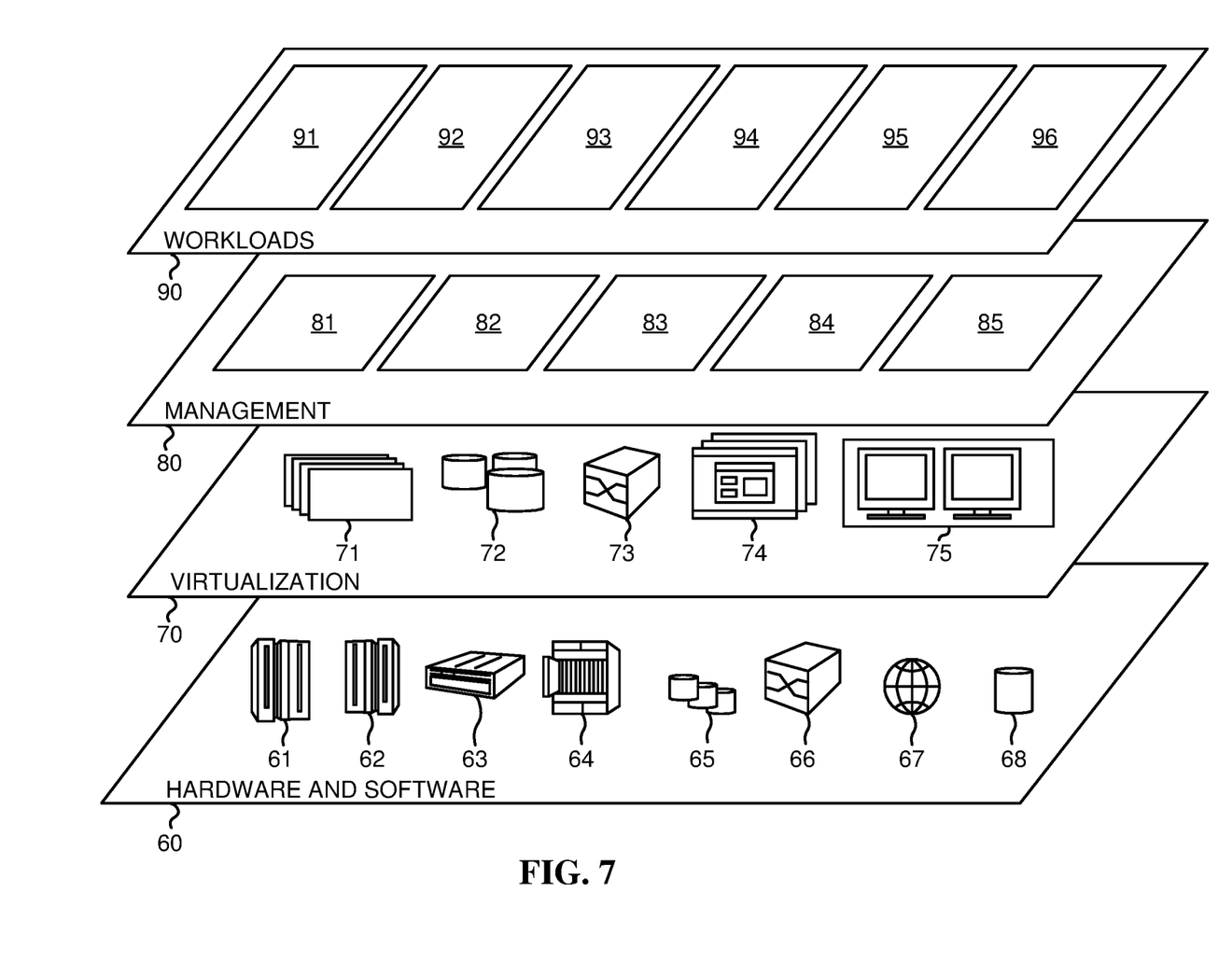
FIG. 7 depicts abstraction model layers, in accordance with some embodiments of the present disclosure.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and RPA bot testing using an ART bot 96.

Embodiments of the present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or subset of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the process software (e.g., any of the instructions stored in instructions 560 of FIG. 5 and/or any software configured to perform any portion of the method described with respect to FIGS. 3-4 and/or implement the functionality discussed in FIGS. 1-2 can be deployed by manually loading it directly in the client, server, and proxy computers via loading a storage medium such as a CD, DVD, etc., the process software can also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Embodiments of the present invention can also be delivered as part of a service engagement with a client corporation, nonprofit organization, government entity, internal organizational structure, or the like. These embodiments can include configuring a computer system to perform, and deploying software, hardware, and web services that implement, some or all of the methods described herein. These embodiments can also include analyzing the client's operations, creating recommendations responsive to the analysis, building systems that implement subsets of the recommendations, integrating the systems into existing processes and infrastructure, metering use of the systems, allocating expenses to users of the systems, and billing, invoicing (e.g., generating an invoice), or otherwise receiving payment for use of the systems.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

Any advantages discussed in the present disclosure are example advantages, and embodiments of the present disclosure can exist that realize all, some, or none of any of the discussed advantages while remaining within the spirit and scope of the present disclosure.

A non-limiting list of examples are provided hereinafter to demonstrate some aspects of the present disclosure. Example 1 is a computer-implemented method. The method includes deploying a robotic process automation (RPA) bot and an autonomous robot tester (ART) bot into a computational environment, wherein the RPA bot automates tasks on an application implemented in the computational environment by manipulating a graphical user interface (GUI) associated with the computational environment and the application; performing, by the ART bot, a plurality of tests configured to disrupt the RPA bot by manipulating the GUI; and detecting whether the RPA bot passes the plurality of tests.

Example 2 includes the method of example 1, including or excluding optional features. In this example, the computational environment is a test environment.

Example 3 includes the method of example 1, including or excluding optional features. In this example, the computational environment is a production environment.

Example 4 includes the method of any one of examples 1 to 3, including or excluding optional features. In this example, the plurality of tests are implemented in a random order by the ART bot.

Example 5 includes the method of any one of examples 1 to 4, including or excluding optional features. In this example, one of the plurality of tests is configured for an operating system (OS) deployed by the computational environment. Optionally, the one of the plurality of tests is selected from a group consisting of: opening a menu, opening a dialog box, and moving a mouse cursor.

Example 6 includes the method of any one of examples 1 to 5, including or excluding optional features. In this example, performing the plurality of tests further comprises: generating, by the ART bot, a random number; selecting one of the plurality of tests corresponding to the random number; executing the one of the plurality of tests; and determining, in response to executing the one of the plurality of tests, whether the RPA bot crashed. Optionally, the method includes in response to determining that the RPA bot crashed, notifying an orchestrator communicatively coupled to the computational environment. Optionally, the orchestrator is notified via an orchestrator adaptor of the ART bot, wherein the orchestrator adaptor is configured to interface with a variety of types of orchestrators. Optionally, the method includes in response to determining that the RPA bot did not crash, determining whether there are any remaining tests of the plurality of tests to execute; in response to determining there is at least one remaining test, generating additional random numbers; selecting additional tests of the at least one remaining test corresponding to the additional random numbers; executing the additional tests; and determining, in response to executing each of the additional tests, whether the RPA bot crashed.

Example 7 includes the method of any one of examples 1 to 6, including or excluding optional features. In this example, the method is performed by one or more computers according to software that is downloaded to the one or more computers from a remote data processing system. Optionally, the method further comprises: metering a usage of the software; and generating an invoice based on metering the usage.

Example 8 is a system. The system includes a computational environment configured to present a graphical user interface (GUI) on a display; an application configured to run on the computational environment; a robotic process automation (RPA) bot configured to execute tasks on the application using the GUI; and an autonomous robot tester (ART) bot configured to execute a plurality of tests to disrupt the RPA bot by manipulating the GUI.

Example 9 includes the system of example 8, including or excluding optional features. In this example, the computational environment is implemented in a test environment.

Example 10 includes the system of example 8, including or excluding optional features. In this example, the computational environment is implemented in a production environment.

Example 11 includes the system of any one of examples 8 to 10, including or excluding optional features. In this example, least one of the plurality of tests is selected from a group consisting of: opening a menu, opening a dialog box, and moving a mouse cursor.

Example 12 includes the system of any one of examples 8 to 11, including or excluding optional features. In this example, the plurality of tests are executed in a random order.

Example 13 includes the system of any one of examples 8 to 12, including or excluding optional features. In this example, the ART bot is configured to execute the plurality of tests by: generating a random number; selecting one of the plurality of tests corresponding to the random number; executing the one of the plurality of tests; and determining, in response to executing the one of the plurality of tests, whether the RPA bot crashed.

Example 14 includes the system of any one of examples 8 to 13, including or excluding optional features. In this example, the ART bot further comprises: an orchestrator adaptor communicatively coupled to an orchestrator associated with the computational environment, wherein the ART bot is configured to notify, using the orchestrator adaptor, the orchestrator when the RPA bot crashes as a result of executing the one of the plurality of tests.

Example 15 is a system. The system includes one or more processors and one or more computer-readable storage media storing program instructions which, when executed by the one or more processors, are configured to cause the one or more processors to perform a method according to any one of examples 1 to 7.

Example 16 is a computer program product. The computer program product includes one or more computer readable storage media, and program instructions collectively stored on the one or more computer readable storage media, the program instructions comprising instructions configured to cause one or more processors to perform a method according to any one of examples 1 to 7.

What is claimed is:

1. A system comprising:
a computational environment comprising a hardware processor and a memory, wherein the computational environment is configured to present a graphical user interface (GUI) on a display;
an application configured to run on the computational environment;
a robotic process automation (RPA) bot configured to execute tasks on the application using the GUI; and
an autonomous robot tester (ART) bot configured to execute a plurality of tests to disrupt the RPA bot by manipulating the GUI.

2. The system of claim 1, wherein the computational environment is implemented in a test environment.

3. The system of claim 1, wherein the computational environment is implemented in a production environment.

4. The system of claim 1, wherein at least one of the plurality of tests is selected from a group consisting of: opening a menu, opening a dialog box, and moving a mouse cursor.

5. The system of claim 1, wherein the plurality of tests are executed in a random order.

6. The system of claim 1, wherein the ART bot is configured to execute the plurality of tests by:

generating a random number;
selecting one of the plurality of tests corresponding to the random number;
executing the one of the plurality of tests; and
determining, in response to executing the one of the plurality of tests, whether the RPA bot crashed.

7. The system of claim 1, wherein the ART bot further comprises:
an orchestrator adaptor communicatively coupled to an orchestrator associated with the computational environment, wherein the ART bot is configured to notify, using the orchestrator adaptor, the orchestrator when the RPA bot crashes as a result of executing the one of the plurality of tests.

8. A computer-implemented method comprising:
deploying a robotic process automation (RPA) bot and an autonomous robot tester (ART) bot into a computational environment, wherein the RPA bot automates tasks on an application implemented in the computational environment by manipulating a graphical user interface (GUI) associated with the computational environment and the application;
performing, by the ART bot, a plurality of tests configured to disrupt the RPA bot by manipulating the GUI; and
detecting whether the RPA bot passes the plurality of tests.

9. The method of claim 8, wherein the computational environment is a test environment.

10. The method of claim 8, wherein the computational environment is a production environment.

11. The method of claim 8, wherein the plurality of tests are implemented in a random order by the ART bot.

12. The method of claim 8, wherein one of the plurality of tests is configured for an operating system (OS) deployed by the computational environment.

13. The method of claim 12, wherein the one of the plurality of tests is selected from a group consisting of: opening a menu, opening a dialog box, and moving a mouse cursor.

14. The method of claim 8, wherein performing the plurality of tests further comprises:
generating, by the ART bot, a random number;
selecting one of the plurality of tests corresponding to the random number;
executing the one of the plurality of tests; and
determining, in response to executing the one of the plurality of tests, whether the RPA bot crashed.

15. The method of claim 14, further comprising:
in response to determining that the RPA bot crashed, notifying an orchestrator communicatively coupled to the computational environment.

16. The method of claim 15, wherein the orchestrator is notified via an orchestrator adaptor of the ART bot, wherein the orchestrator adaptor is configured to interface with a variety of types of orchestrators.

17. The method of claim 14, further comprising:
in response to determining that the RPA bot did not crash, determining whether there are any remaining tests of the plurality of tests to execute;
in response to determining there is at least one remaining test, generating additional random numbers;
selecting additional tests of the at least one remaining test corresponding to the additional random numbers;
executing the additional tests; and
determining, in response to executing each of the additional tests, whether the RPA bot crashed.

18. The method of claim 8, wherein the method is performed by one or more computers according to software that is downloaded to the one or more computers from a remote data processing system.

19. The method of claim 18, wherein the method further comprises:
metering a usage of the software; and
generating an invoice based on metering the usage.

20. A computer program product comprising one or more computer readable storage media, and program instructions collectively stored on the one or more computer readable storage media, the program instructions comprising instructions configured to cause one or more processors to perform a method comprising:
deploying a robotic process automation (RPA) bot and an autonomous robot tester (ART) bot into a computational environment, wherein the RPA bot automates tasks on an application implemented in the computational environment by manipulating a graphical user interface (GUI) associated with the computational environment and the application;
performing, by the ART bot, a plurality of tests configured to disrupt the RPA bot by manipulating the GUI; and
detecting whether the RPA bot passes the plurality of tests.

* * * * *